United States Patent
Taylor et al.

(10) Patent No.: US 11,431,881 B2
(45) Date of Patent: *Aug. 30, 2022

(54) PHASED METALENS FOR ADJUSTING A FOCUS OF AN IMAGE

(71) Applicant: Aptiv Technologies Limited, St. Michael (BB)

(72) Inventors: Ronald M. Taylor, Greentown, IN (US); James Nicholas Nickolaou, Clarkston, MI (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,275

(22) Filed: Jul. 2, 2021

(65) Prior Publication Data

US 2022/0141365 A1 May 5, 2022

Related U.S. Application Data

(63) Continuation of application No. 17/087,526, filed on Nov. 2, 2020, now Pat. No. 11,089,188.

(51) Int. Cl.
*H04N 5/225* (2006.01)
*H04N 5/232* (2006.01)

(52) U.S. Cl.
CPC ............ *H04N 5/22521* (2018.08); *H04N 5/232122* (2018.08)

(58) Field of Classification Search
CPC ..................... H04N 5/22521; G02B 1/002
See application file for complete search history.

(56) References Cited

U.S. PATENT DOCUMENTS

| | | | |
|---|---|---|---|
| 6,144,510 A | 11/2000 | Neil et al. | |
| 10,408,416 B2 | 9/2019 | Khorasaninejad et al. | |
| 11,089,188 B1* | 8/2021 | Taylor | H04N 5/22521 |
| 11,089,197 B1 | 8/2021 | Taylor et al. | |
| 11,201,993 B1* | 12/2021 | Wang | G02B 3/0056 |
| 2017/0082263 A1 | 3/2017 | Byrnes et al. | |
| 2017/0146806 A1 | 5/2017 | Lin | |
| 2017/0195545 A1 | 7/2017 | Campbell et al. | |
| 2017/0219739 A1 | 8/2017 | Lin et al. | |
| 2018/0292644 A1 | 10/2018 | Kamli et al. | |
| 2019/0094489 A1 | 3/2019 | Dobashi | |
| 2019/0154877 A1 | 5/2019 | Capasso et al. | |
| 2019/0170314 A1 | 6/2019 | Lenef et al. | |
| 2019/0178720 A1 | 6/2019 | Padilla et al. | |

(Continued)

OTHER PUBLICATIONS

"Extended European Search Report", EP Application No. 21181685.5, dated Nov. 24, 2021, 10 pages.

(Continued)

*Primary Examiner* — Cynthia Segura
(74) *Attorney, Agent, or Firm* — Sawtooth Patent Group PLLC

(57) ABSTRACT

The techniques of this disclosure relate to a system for adjusting a focus of an image. A system includes a phased metalens configured to adjust a focus of an image detected by an imaging substrate of an image sensor to compensate for warpage of the imaging substrate. The phased metalens can achieve a near-diffraction-limited focusing over incoming light wavelengths using precisely defined nanoscale subwavelength resolution structures.

20 Claims, 8 Drawing Sheets

(56) References Cited

U.S. PATENT DOCUMENTS

| | | | |
|---|---|---|---|
| 2019/0383969 A1 | 12/2019 | Badano et al. | |
| 2020/0001787 A1* | 1/2020 | Lu | B60S 1/56 |
| 2020/0096672 A1 | 3/2020 | Yu et al. | |
| 2020/0099851 A1 | 3/2020 | Chino et al. | |
| 2020/0183050 A1* | 6/2020 | Lin | G02B 1/005 |
| 2020/0225386 A1* | 7/2020 | Tsai | G02B 1/002 |
| 2021/0003382 A1* | 1/2021 | Adie | A61B 5/0066 |
| 2021/0044748 A1* | 2/2021 | Hu | G02B 1/002 |
| 2021/0068665 A1* | 3/2021 | Pahlevaninezhad | G02B 27/0025 |
| 2021/0080819 A1* | 3/2021 | Terasawa | G03F 1/50 |
| 2021/0132272 A1* | 5/2021 | Zhu | G01J 3/2823 |
| 2021/0172879 A1* | 6/2021 | Chen | G01N 21/9501 |
| 2021/0235001 A1* | 7/2021 | Taylor | H04N 5/232122 |
| 2021/0307608 A1* | 10/2021 | Hu | G02B 27/0172 |
| 2021/0337095 A1 | 10/2021 | Taylor et al. | |
| 2021/0337140 A1* | 10/2021 | Siddique | H04N 5/33 |

OTHER PUBLICATIONS

Jang, et al., "Complex wavefront engineering with disorder-engineered metasurfaces", Jun. 27, 2017, 21 pages.

Kamali, et al., "Conformal and Tunable Optical Dielectric Metasurfaces Based on Flexible Stretchable Substrates", Oct. 2016, pp. 406-407.

"Extended European Search Report", EP Application No. 20207221.1, dated Mar. 26, 2021, 8 pages.

"Non-Final Office Action", U.S. Appl. No. 16/773,360, dated Dec. 22, 2020, 11 pages.

"Notice of Allowance", U.S. Appl. No. 16/773,360, dated Apr. 6, 2021, 7 pages.

"Notice of Allowance", U.S. Appl. No. 17/087,526, dated Apr. 14, 2021, 10 pages.

Afridi, et al., "Electrically Driven Varifocal Silicon Metalens", Oct. 2018, 17 pages.

Ding, et al., "Graphene aperture-based metalens for dynamic focusing of terahertz waves", Oct. 15, 2018, 13 pages.

Jin, et al., "Temperature-tuned and excellent omnidirectional bending of light to the normal for energy concentration in an index-continuous structure", Jul. 27, 2020, 10 pages.

Khorasaninejad, et al., "Metalenses at Visible Wavelengths: Diffraction-limited Focusing and Subwavelength Resolution Imaging", Jun. 3, 2016, pp. 1190-1193.

Li, et al., "A Metalens-Based Virtual Reality (VR) / Augmented Reality (AR) System", Jan. 2020, 2 pages.

Liu, et al., "Ultrathin van der Waals metalenses", Oct. 2018, 22 pages.

Yang, et al., "Multiobjective Firefly Algorithm for Continuous Optimization", Apr. 2013, 17 pages.

Yu, et al., "Flat Optics with Designer Metasurfaces", Nature Materials, vol. 13, Feb. 2014, pp. 139-150.

* cited by examiner

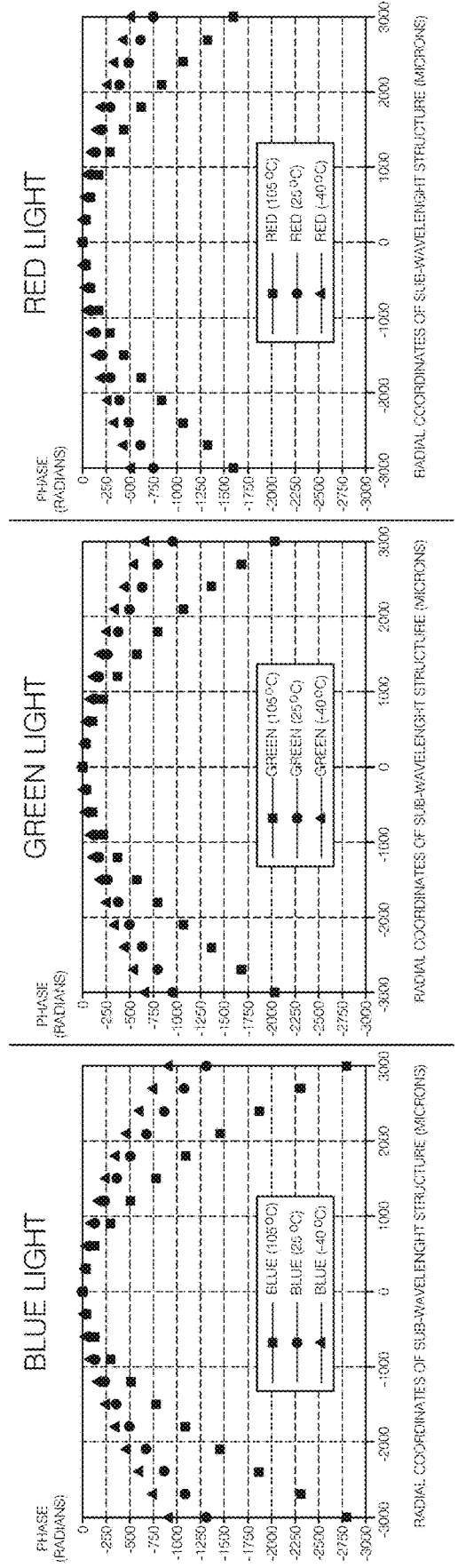
FIG. 9A
FIG. 9B
FIG. 9C
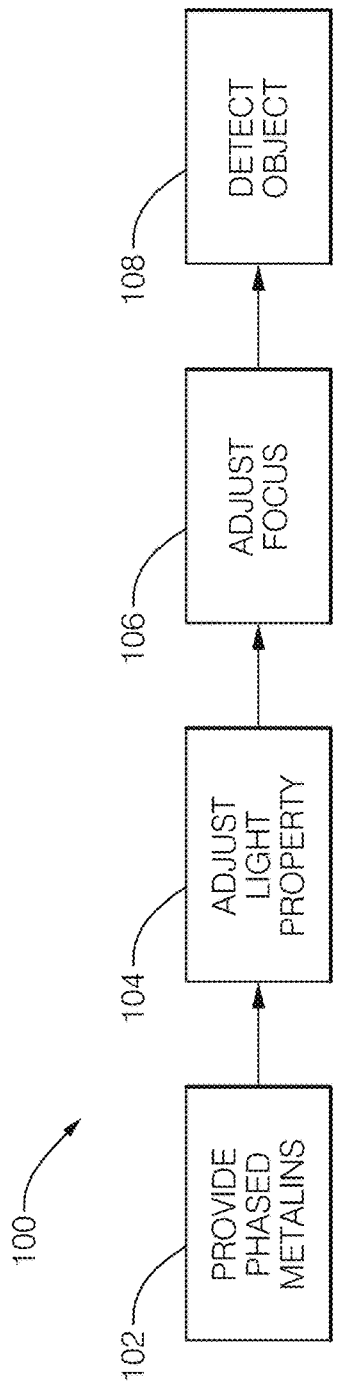
FIG. 10

PHASED METALENS FOR ADJUSTING A FOCUS OF AN IMAGE

CROSS-REFERENCE TO RELATED MATTER

This application is a continuation of and claims priority to U.S. patent application Ser. No. 17/087,526, filed Nov. 2, 2020, the entire disclosure of which is hereby incorporated by reference.

BACKGROUND

Fixed-focus cameras used for automotive applications are typically aligned and focused at room temperature. These cameras may experience defocus, also known as a change in back-focal length, over operating temperatures associated with various automotive applications due to thermal expansion and contraction of the camera and the internal camera components. Thermal expansion and contraction affect both a lens system of the camera and an image sensor of the camera and may result from external environmental temperature changes as well as internal device operating temperature changes. Newer generation advanced driver-assistance system (ADAS) cameras typically have larger image sensors that are more susceptible to warpage, the amount of which can change with the changing temperature of the image sensor. For a traditional fixed-focus lens system, a change in a back-focal length of 15 microns to 20 microns would require the same movement by the complete lens system or could be accomplished by an introduction of a lens element index of refractive change, a lens element material thickness change, a lens curvature change, or smaller contributions by combinations of the above.

The typical camera used for advanced driver assistance systems (ADAS) may be required to operate over a temperature range of −40° C. to 105° C., and are typically focused during the manufacturing or assembly process at 25° C. This temperature range may result in a change in the focal length of the camera due to expansion or contraction of the camera housing by as much as 16 microns (16 μm). In addition, this temperature range may separately result in warpage of an imaging substrate that causes a change in the focal length of the camera by as much as 7 μm. ADAS cameras that have fixed-focus lenses with relatively large apertures and relatively low f-stops have a reduced depth of focus compared to more expensive adjustable focus cameras. As a result, the thermal expansion of ADAS cameras over the 145° C. temperature range will cause a significant and measurable (e.g., 25% to 50%) degradation in an image quality, which may negatively affect the ADAS systems. It may be desirable for autonomous vehicle camera requirements to drive toward smaller camera image sensor pixel sizes (e.g., 2 μm), higher density focal planes (e.g., 8 Megapixel arrays), and higher spatial frequency contrast image quality requirements (e.g., greater than 75 line pairs/mm). Consequently, the image degradation over temperature for the larger format cameras may be proportionately higher and reduce object detection performance of the ADAS system.

SUMMARY

This document describes one or more aspects of a phased metalens for adjusting a focus of an image. In one example, a system includes a phased metalens configured to adjust a focus of an image detected by an imaging substrate of an image sensor. The phased metalens is further configured to adjust a property of light that reaches the imaging substrate based on a change in a flatness of the imaging substrate.

In another example, a camera includes a phased metalens positioned between an objective lens and an image sensor of the camera. The phased metalens is configured to adjust a focus of an image detected by the image sensor of the camera. The phased metalens is further configured to adjust phases of rays of light of the image across an imaging substrate of the image sensor, based on a change in a flatness of the imaging substrate such that all rays of light exiting the phased metalens reach the imaging substrate at a same time.

In another example, a method includes adjusting, with a phased metalens, a property of light that reaches an imaging substrate of an image sensor. The adjustment is based on a change in a flatness of the imaging substrate. All light exiting the phased metalens reaches the imaging substrate at a same time, thereby adjusting a focus of an image detected by the imaging substrate.

This summary is provided to introduce aspects of a phased metalens for adjusting a focus of an image, which is further described below in the Detailed Description and Drawings. For ease of description, the disclosure focuses on vehicle-based or automotive-based systems, such as those that are integrated on vehicles traveling on a roadway. However, the techniques and systems described herein are not limited to vehicle or automotive contexts but also apply to other environments where cameras can be used to detect objects. This summary is not intended to identify essential features of the claimed subject matter, nor is it intended for use in determining the scope of the claimed subject matter.

BRIEF DESCRIPTION OF THE DRAWINGS

The details of one or more aspects of a phased metalens for adjusting a focus of an image are described in this document with reference to the following drawings. The same numbers are used throughout the drawings to reference like features and components:

FIG. 9A is an example plot of phase adjustment for blue light.

FIG. 9B is an example plot of phase adjustment for green light.

FIG. 9C is an example plot of phase adjustment for red light.

FIG. 10 illustrates an example method of adjusting a focus of an image.

DETAILED DESCRIPTION

Overview

The techniques of this disclosure relate to a phased metalens for adjusting a focus of an image. The phased metalens can vary a focus characteristic of a lens system of the camera in real time to adapt to a change in focus due to thermal expansion and contraction based on an operating temperature of the camera. Newer-generation advanced driver-assistance system (ADAS) image sensors may have larger focal plane areas and may experience a greater incidence of image sensor die warpage, which changes a normally planar shape of the image sensor substrate over changes in temperature.

Figure 1:
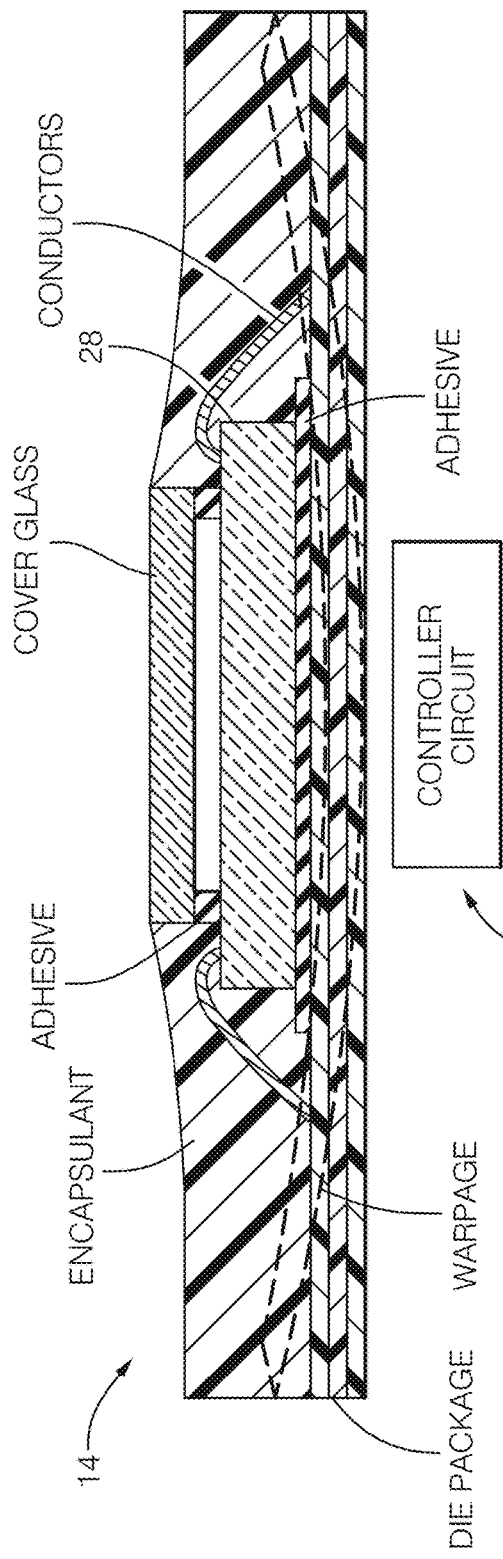
FIG. 1 illustrates an example image sensor package.

FIG. 1 illustrates an example image sensor package that includes the imager sensor substrate (hereafter referred to as the imaging substrate), a cover glass, an encapsulant, a die package, and conductors to attach the image sensor substrate to a die package. During an example manufacturing process of the image sensor, the die package may be temporarily vacuum-retained flat using a vacuum chuck while the imaging substrate is bonded to the die package using an adhesive, for example, an epoxy. In some examples, the imaging substrate is a silicon die or chip that includes photodetector devices arranged in an array on a surface of the imaging substrate. A cover glass is typically applied over the imaging substrate, and the imaging substrate is wire-bonded to the package with conductive wires. The wire-bonded assembly is encapsulated with an epoxy material and thermally cured at an elevated temperature (e.g., 150° C.). As a result of the encapsulant curing process, there can exist a stress-induced warpage of the imaging substrate plane that increases with decreasing operating temperature from the initial curing process. That is, as the image sensor cools to room temperature, the warpage of the imaging substrate may increase.

The warpage may be greater at the outer edges of the package, as illustrated by the dashed lines in FIG. 1, and can vary from the center out to the corners of the imaging substrate, thereby resulting in a variation in the focus shift across the image sensor field. This focus shift is in addition to the change in focus due to the back-focal length caused by thermal expansion or contraction of the camera. This warpage can be on the order of three microns to ten microns depending on the size of the imaging substrate focal plane and a magnitude of the induced stress from the manufacturing process.

A result of this warpage is that the image may be in focus at a particular position on the imaging substrate (e.g., at a center of the imaging substrate) and out of focus at the edges of the imaging substrate. Unlike an auto-focus lens system which uses a sensor, control system, and a motor to focus the image on the imaging substrate, the phased metalens automatically adapts a focus field. This adaptation of the focus field is accomplished with a static, relatively thin phased metalens element that is located between the fixed-focus lens of the camera and the image sensor. The phased metalens is positioned in close proximity to the focal plane of the image sensor (e.g., within a few millimeters of the image sensor cover glass) to compensate for the defocus effect over the operating temperatures of the camera. The phased metalens accomplishes this by achieving near diffraction-limited focusing over the incoming light wavelengths using precisely defined nanoscale subwavelength resolution structures, as will be described in more detail below. While the examples described in this disclosure relate to an example image sensor having a diagonal dimension in a range of 6 millimeters (mm) to 8 mm, it will be appreciated that the phased metalens may be applied to larger image sensors that may experience greater amounts of warpage. Therefore, the diagonal dimension may be a larger or even a smaller size, depending on the warpage.

This disclosure introduces a phased metalens for adjusting a focus of an image. Described is a component of a camera that varies a focus characteristic of a camera lens system to adapt to changes in focus caused by changes in warpage of the imaging substrate.

Example System

Figure 2:
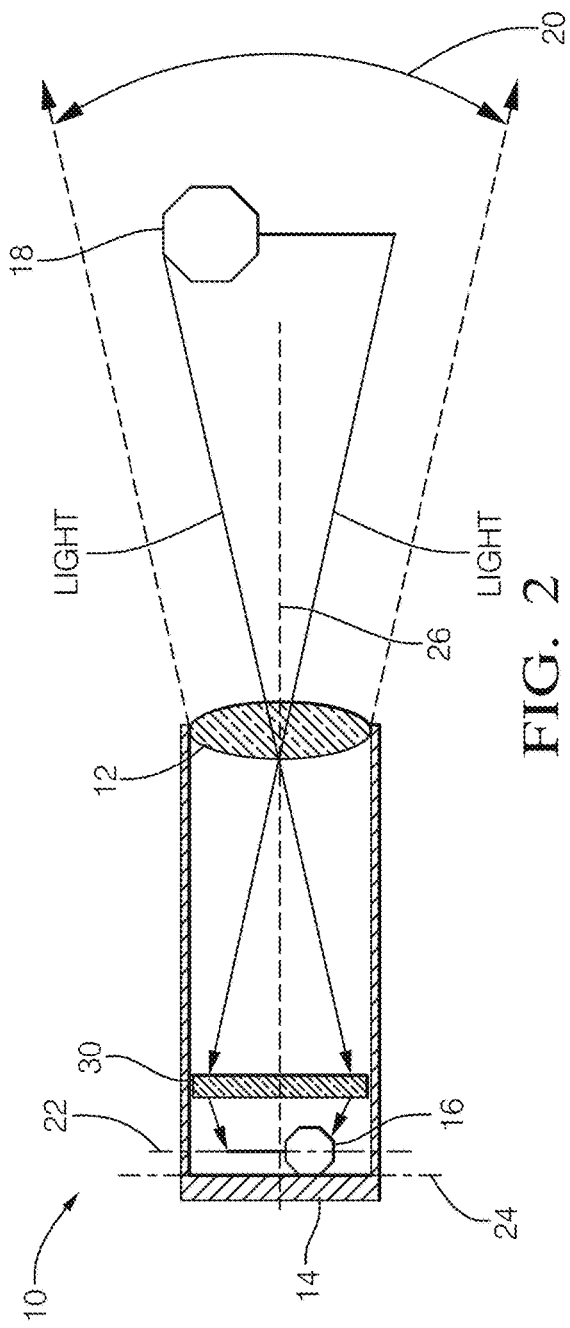
FIG. 2 illustrates an example camera including an example phased metalens for adjusting a focus of an image.

FIG. 2 illustrates a cross-sectional view of a camera 10 that includes an objective lens 12 and an image sensor 14. While the examples illustrated herein disclose the camera 10, it will be appreciated that the disclosure also applies to other devices or sensors that sense electromagnetic radiation, for example, light detection and ranging (LiDAR) sensors and X-ray detection systems. The image sensor 14 may be comprised of a two-dimensional array of pixels organized into rows and columns that define a resolution of the camera 10. The pixels may be comprised of a Charge Coupled Device (CCD) and/or a Complementary Metal Oxide Semiconductor (CMOS) that converts light into electrical energy based on an intensity of the light reaching the pixels. The image sensor 14 may be in electrical communication with a controller circuit 15 (not shown) to process an image 16 of an object 18 in a field of view 20 of the camera 10.

The controller circuit 15 may be configured to receive image data from the image sensor 14, representing a captured image of the object 18. The controller circuit 15 may be implemented as a microprocessor or other control circuitry such as analog and/or digital control circuitry. The controller circuit 15 may include one or more application-specific integrated circuits (ASICs), field programmable gate arrays (FPGAs) that are programmed to perform the techniques, or one or more general-purpose hardware processors programmed to perform the techniques pursuant to program instructions in firmware, memory, other storage, or a combination. The controller circuit 15 may also combine custom hard-wired logic, ASICs, or FPGAs with custom programming to accomplish the techniques. The controller circuit 15 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying programming signals. The controller circuit 15 may include other examples of non-volatile memory, (e.g., flash memory, read-only memory (ROM), programmable read-only memory (PROM), and erasable programmable read-only memory (EPROM). The controller circuit 15 may include volatile memory, such as dynamic random-access memory (DRAM), static random-access memory (SRAM)). The one or more routines may be executed by the controller circuit 15 to perform steps for detecting the object 18 based on signals received by the controller circuit 15 from the image sensor 14 as described herein.

In some examples, multiple camera lenses (not shown) of varying geometries may be used in the camera 10, depending on the application requirements. In the example illustrated in FIG. 2, a focal length of the camera 10 is fixed. That is, the camera 10 does not include a mechanical or electrical focus adjustment device to refocus the image 16 when a focus field 22 of the camera 10 moves away from a focal plane 24 of the image sensor 14, in other words a defocus.

The focus field 22 is a plane in which the image is in focus. In some examples, thermal expansion and contraction of the camera 10, due to an operating temperature variation, may cause the camera 10 to defocus due to expansion or contraction of a lens barrel or a camera housing that retains the one or more lenses. It will be understood that the focus field 22 may move in a positive direction, that is, toward the image sensor 14 as is illustrated in FIG. 2, or may move in a negative direction (i.e., away from the image sensor 14) along an optical axis 26 or bore sight of the camera 10, due to thermal expansion or thermal contraction of the camera 10. In other examples, thermal changes experienced by the camera 10 may cause a warpage of the image sensor 14 that causes a non-uniform distribution of the focus field 22 projected across the image sensor 14, as will be described in more detail below.

These thermal changes may be caused by the external environment or may be due to internal operating temperatures of the image sensor 14 being powered up and/or powered down. To address the defocus issue of the fixed-focus camera 10, a phased metalens 30 is positioned between the objective lens 12 and the image sensor 14 of the camera 10, as illustrated in FIG. 2. In some examples, the phased metalens 30 is configured to adjust a focus of the image 16 detected by the imaging substrate 28 of the image sensor 14 by adjusting a property of light that reaches the imaging substrate 28, based on a change in a flatness of the imaging substrate 28. In other examples, the phased metalens 30 is configured to adjust the focus of the image 16 detected by the imaging substrate 28 based on both the change in a flatness of the imaging substrate 28 and the thermal expansion of the camera 10.

Figure 3:
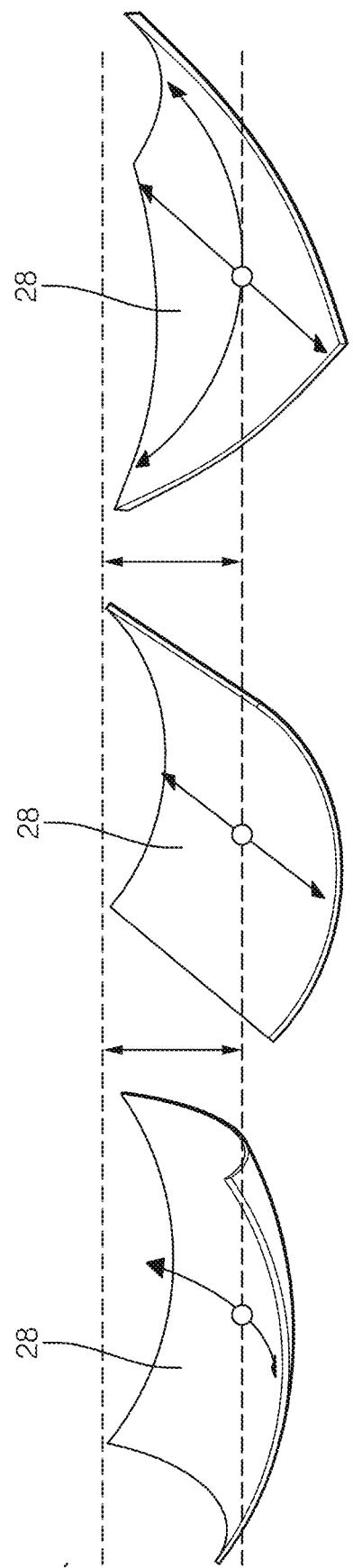
FIGS. 3A-3C illustrates an example of a warpage of an imaging substrate of the image sensor.

FIGS. 3A to 3C illustrate the imaging substrate 28 isolated from the image sensor 14 and show examples of warpage of the imaging substrate 28. As mentioned above, the imaging substrate 28 is bonded to the image sensor die and encapsulated at an elevated temperature, which may induce stresses on the imaging substrate 28 upon cooling to room temperature. The warpage of the imaging substrate 28 may result in various non-planar geometries depending on the residual stresses caused by packaging design. In these examples, corners of the rectangular imaging substrate 28 have larger displacements than the center of the imaging substrate 28.

While FIGS. 3A to 3C illustrate examples of symmetric warpage where a center of the imaging substrate 28 is offset from edges of the imaging substrate 28, other geometries may result, including saddle shapes and various non-symmetric combinations of concave/convex geometries. The resulting warpage geometry of the imaging substrates 28 will likely be consistent for imaging substrates 28 packaged in identical image sensors 14 and assembled into identical camera 10 models. As a result of this consistent warpage geometry, a common phased metalens 30 configuration or arrangement may be designed and applied to a family of image sensors 14 and/or cameras 10.

To address the defocus issue of the fixed-focus camera 10, the phased metalens 30 is positioned between the objective lens 12 and the image sensor 14 of the camera 10, as illustrated in FIG. 2. The phased metalens 30 adjusts the focus by shifting a phase of the incoming light rays via a plurality of sub-wavelength structures 32, as will be described in more detail below. These sub-wavelength structures 32 (also referred to as nanostructures) may be deposited on a relatively thin, generally planar substrate of optically transparent material (e.g., optical glass) and may be formed of metamaterials with structural features that are capable of manipulating the light waves.

In an example, the metamaterials are fabricated using known lithographic processes from compounds such as titanium dioxide, silicon nitride, boron nitride, molybdenum disulfide, polytetrafluoroethylene (PTFE), or combinations thereof. The metamaterials may be selected based on the wavelengths of the electromagnetic radiation being sensed. In some examples, titanium dioxide may be selected for light in the visible and near-infrared spectrum. In other examples, silicon nitride may be selected for light in the visible spectrum. In other examples, boron nitride may be selected for electromagnetic radiation at wavelengths below the visible and near-infrared spectrum (e.g., ultraviolet light). In other examples, molybdenum disulfide may be selected for electromagnetic radiation at wavelengths in the near-infrared spectrum.

Figure 4:
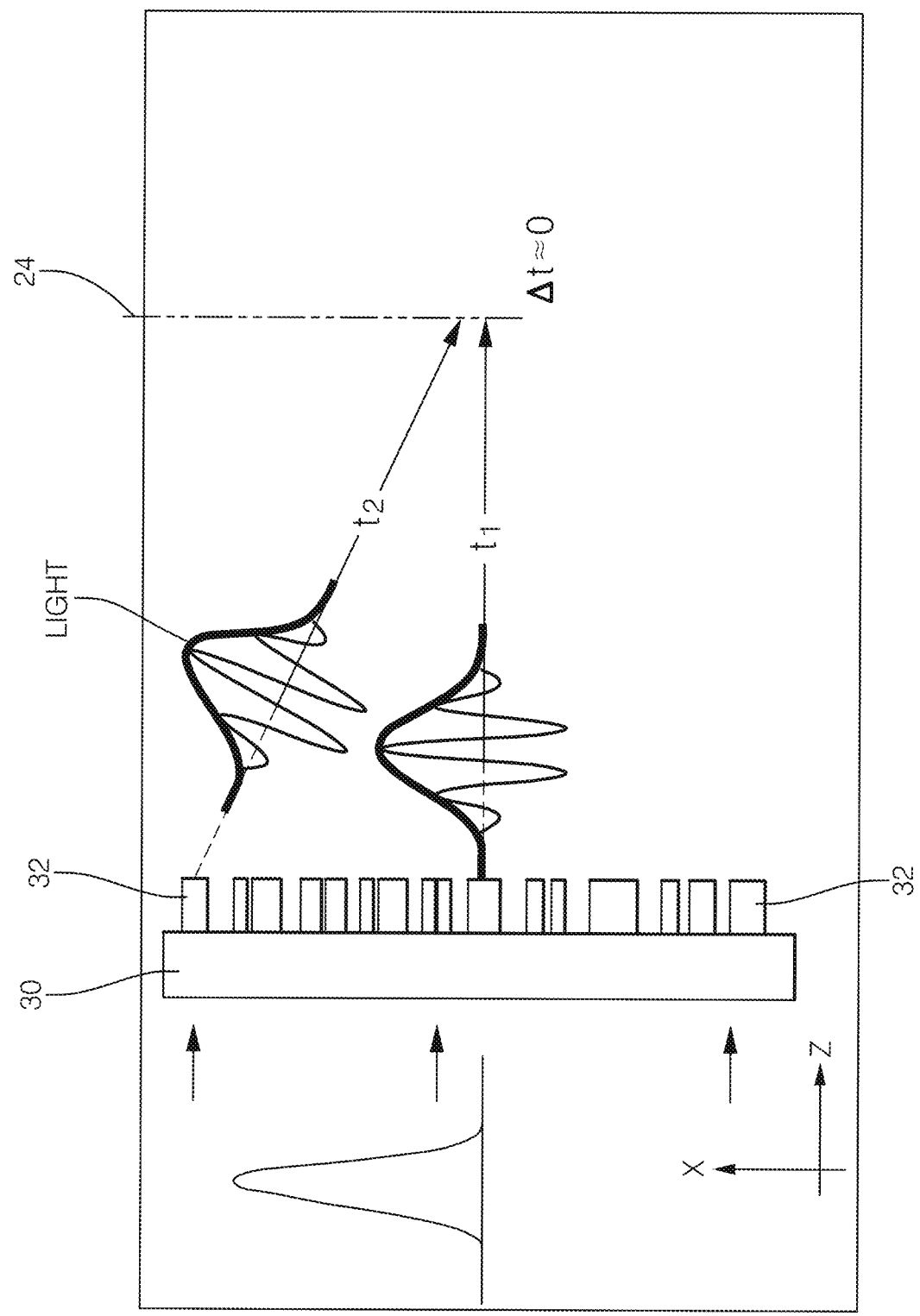
FIG. 4 illustrates an example of wave fronts of light rays exiting from different regions of the phased metalens reaching the image substrate plane at a same time.

FIG. 4 illustrates an example where the wave fronts of the light rays exiting from different regions of the example phased metalens 30 reach the focal plane 24 if the imaging substrate 28 at a same time (i.e., Δt=0, in phase). In some examples, the sub-wavelength structures 32 are fabricated on an exit side of the substrate, that is, the side facing the image sensor 14. In some examples, a cross-section of the sub-wavelength structures 32 normal to the incident light rays is rectangular. In other examples, the cross-section of the sub-wavelength structures 32 normal to the incident light rays is circular. The different shaped cross sections of the sub-wavelength structures 32 are selected to ensure the designed phase shift is applied to the incoming light rays.

The phased metalens 30 is configured to shift the phase of the incoming light rays such that all light or light wavefronts exiting the phased metalens 30 arrive at the imaging substrate 28 at a same time, resulting in good focus for all temperature conditions. That is, the phased metalens 30 delays the light or light wave-fronts by differing amounts, depending on the position of the sub-wavelength structures 32 on the phased metalens 30, such that all the light or light wave-fronts reach a same reference point on the imaging substrate 28 at the same time. The reference point may be a point having a greatest distance from the phased metalens 30 along a line normal to a plane defining the image focus field 22 of the phased metalens 30. This aspect of the phased metalens 30 enables adjusting the focus of the image 16 over the non-planar focal surface of the warped imaging substrate 28. The phased metalens 30 accomplishes this by achieving near-diffraction-limited focusing over the incoming light wavelengths using precisely defined nanoscale sub-wavelength resolution structures. In some examples, the phase relationship for the phased metalens 30 is defined by the design wavelength, a sub-wavelength structure shape, and the phased metalens 30 focal length, using the known equation below, $$\varphi_{nf}(x, y) = \frac{2\pi}{\lambda_d}\left(f - \sqrt{x^2 + y^2 + f^2}\right)$$

where $\lambda_d$ is the design wavelength, f is the focal length for the converging phased metalens 30, and x and y are the coordinates of the sub-wavelength structures 32 on the phased metalens 30.

To account for the focus variation that results from the operating temperature range of the camera 10, the phased metalens 30 includes the sub-wavelength structures 32 arranged in unique phase profiles to compensate for the multiple focal length changes. That is, the phased metalens 30 includes multiple unique phase profiles designed for multiple offsets of the focal length, so that as the focal length is offset by the temperature change induced warpage and expansion or contraction, the light rays exiting the phased metalens 30 will remain in phase.

Figure 5:
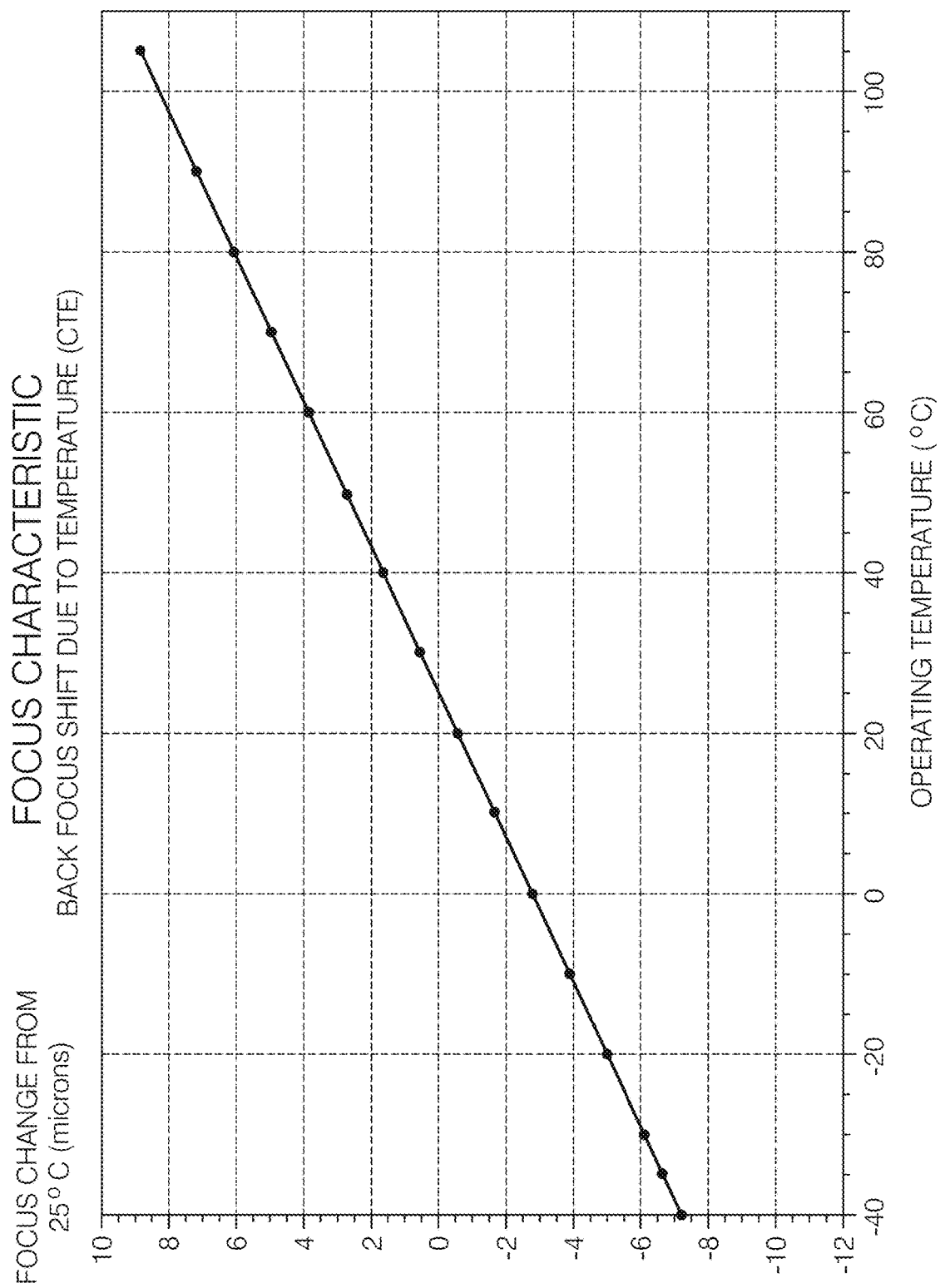
FIG. 5 illustrates an example of a focus characteristic of the example phased metalens.

FIG. 5 illustrates an example focus characteristic of the example phased metalens 30. In this example, the phased metalens 30 is configured to adjust the focus field 22 over the temperature range of about 145° C. and over the associated changes in focal length of about 16 μm. In this example, the change in focal length is due primarily to the change in length of the camera housing caused by changes in the operating temperature. Starting from 25° C., where the focus change is zero due to the camera being focused at this temperature, the phased metalens 30 imparts a positive back focus shift as the temperature increases (e.g., to compensate for the expansion or lengthening of the camera housing), and imparts a negative back focus shift as the temperature decreases (e.g., to compensate for the contraction or shortening of the camera housing).

Figure 6:
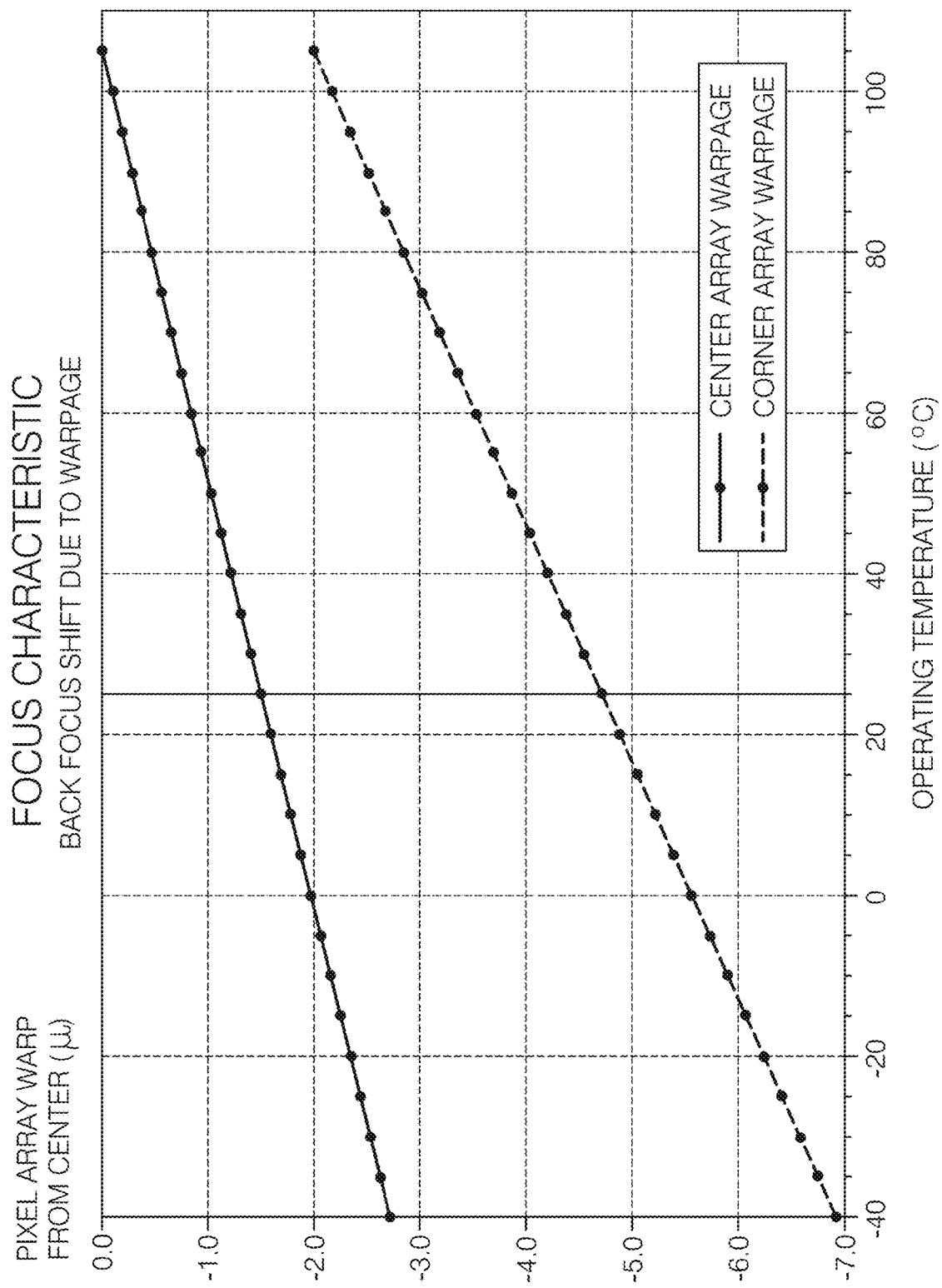
FIG. 6 illustrates another example of a focus characteristic of the example phased metalens.

FIG. 6 illustrates another example focus characteristic of the example phased metalens 30. In this example, the phased metalens 30 is configured to adjust the focus field 22 over the temperature range of about 145° C. The phased metalens 30 is also configured to adjust the focus field 22 and over the associated changes in a flatness range of the imaging substrate 28 in a range of about 3 μm in the center of the imaging substrate 28 as indicated by the solid line, and in a range of about 7 μm at corners of the imaging substrate 28 as indicated by the dashed line. As described above, the imaging substrate 28 is relatively planar at the encapsulant curing temperature of 150° C. and warps upon cooling such that, at 25° C., the focus field 22 at the center and corners of the imaging substrate 28 is adjusted based on the amount of warpage. For example, at the center of the imaging substrate 28, the phased metalens 30 adjusts the focus field 22 by about −1.5 μm, and at the corners of the imaging substrate 28 adjusts the focus field 22 by about −4.75 μm to compensate for the warpage. The phased metalens 30 is configured to adjust the focus field 22 by a larger amount as the temperature reduces further from the initial curing temperature, as can be seen by the slopes of the solid and dashed lines.

Figure 7:
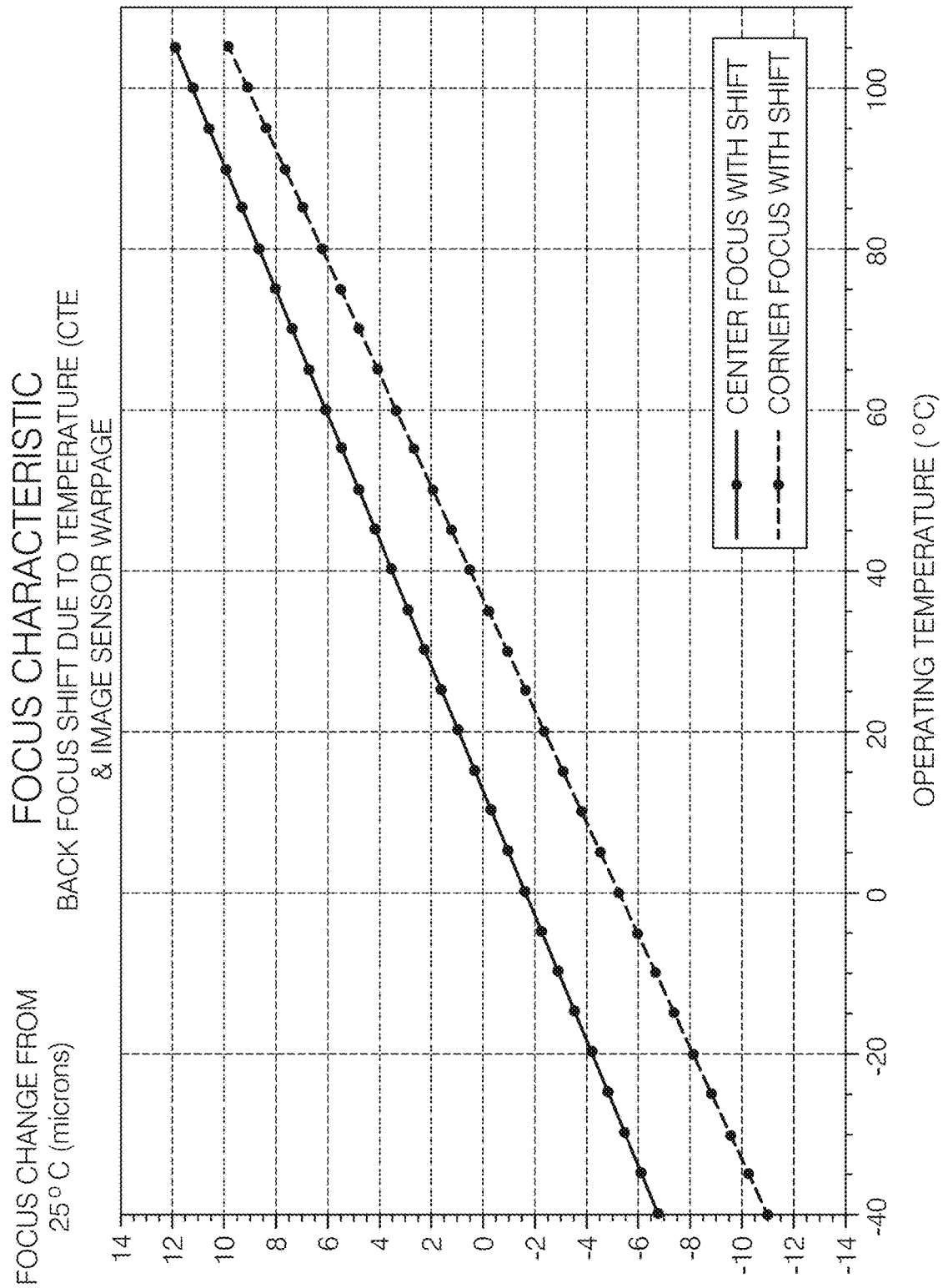
FIG. 7 illustrates yet another example of a focus characteristic of the example phased metalens.

FIG. 7 illustrates yet another example focus characteristic of the example phased metalens 30. In this example, the phased metalens 30 is configured to adjust the focus field 22 over the temperature range of about 145° C. and compensates for both the expansion and/or contraction of the camera housing and the warpage of the imaging substrate 28. As can be seen in FIG. 7, the phased metalens 30 adjusts the focus field 22 for the center of the imaging substrate over the range of about 19 μm and adjusts the focus field 22 for the corners of the imaging substrate over the range of about 21 μm. That is, the phased metalens 30 adjusts the phase of the light over a range of zero μm to about 20 μm, compensating for both the changes in flatness of the imaging substrate 28 and for the thermal expansion or contraction of the camera housing.

The phased metalens 30 may also be configured to adjust the focus field 22 by adjusting phases of light for multiple frequencies or wavelengths of the light entering the phased metalens 30. In some examples, the wavelengths range from about 250 nm to about 1600 nm (i.e., ultraviolet light to near-infrared light). In other examples, the wavelengths range from about 250 nm to about 400 nm (i.e., ultraviolet light only). In other examples, the wavelengths range from about 400 nm to about 700 nm (i.e., visible light only). In other examples, the wavelengths range from about 700 nm to about 1600 nm (i.e., near-infrared light only). The selection of the specific range of wavelengths is based on the application of the phased metalens 30 to the type of camera 10 or sensor being used to detect the object 18.

An aspect of the camera 10 is that the phased metalens 30 is placed in close proximity to the image sensor 14. In some examples, the phased metalens 30 is positioned within 1 mm of the focus field 22 (e.g., at or near the surface of the imaging substrate 28). In some examples, a thickness of the phased metalens 30 is less than 1 mm, and preferably less than 25 μm. This relatively thin structure enables the phased metalens 30 to be positioned in the typically narrow space between the fixed-focus objective lens 12 and the focal plane 24. This positioning enables greater flexibility allowing for the compensation of the thermal-driven defocus, while otherwise being independent of the existing fixed lens system.

Figure 8:
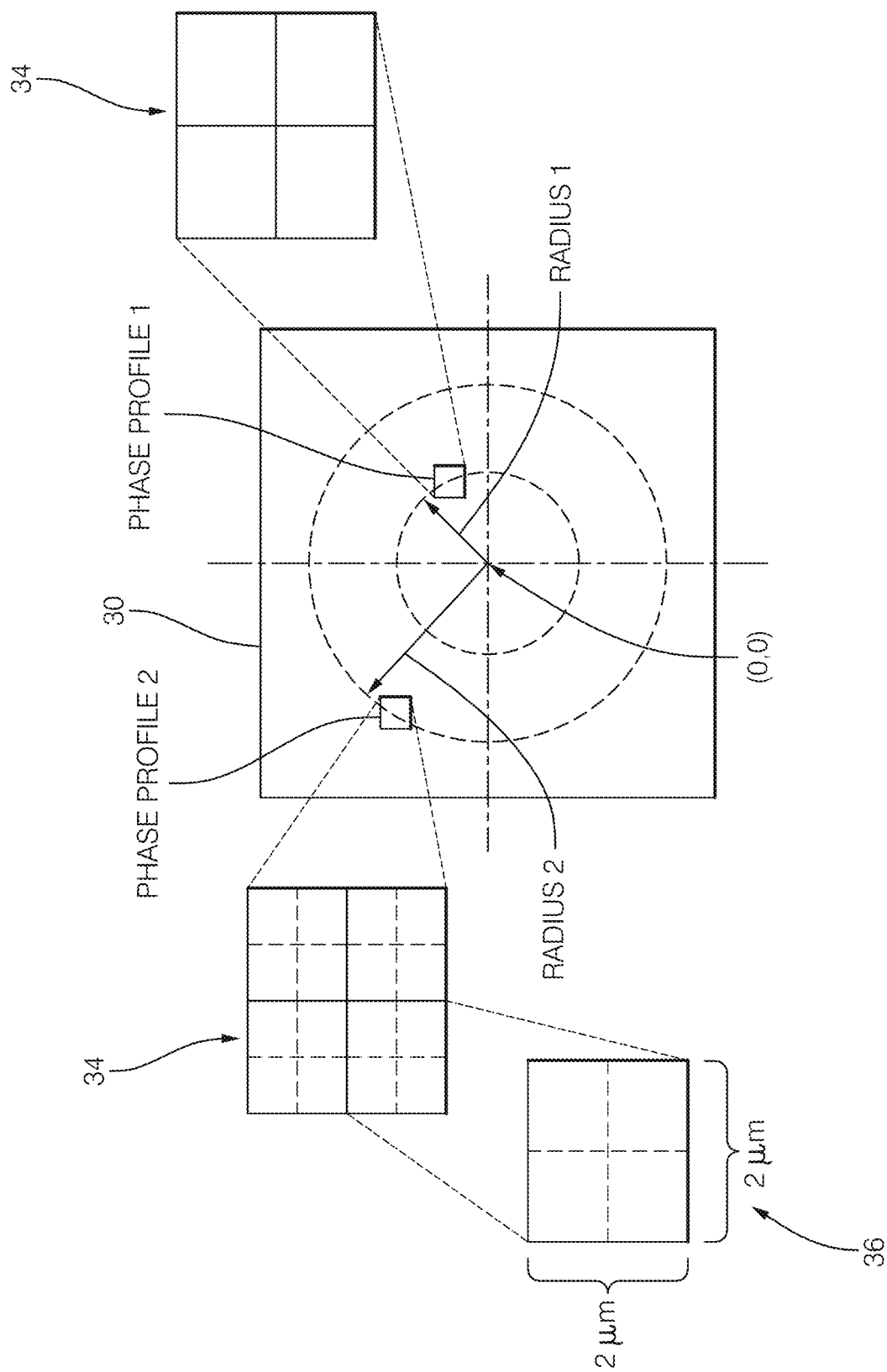
FIG. 8 illustrates an example of the phased metalens viewed along an optical axis of the camera.

FIG. 8 illustrates the phased metalens 30 viewed along the optical axis 26 of the camera 10. The phased metalens 30 includes the plurality of sub-wavelength structures 32 (see FIG. 4) positioned at predetermined coordinates across the phased metalens 30. In some examples, the plurality of sub-wavelength structures 32 range from two times to eight times smaller than the wavelength of the light transmitted through the phased metalens 30. In some examples, the sub-wavelength structures 32 that shift blue light (having wavelengths that range from 450 nm-485 nm) have cross-sectional dimensions normal to the incident light rays that range from 0.050 μm to 0.150 μm. It will be recognized that light with longer wavelengths will require larger sub-wavelength structures 32 to cause the phase shift and that light with shorter wavelengths will require smaller sub-wavelength structures 32 to cause the phase shift.

Referring again to FIG. 8, the plurality of sub-wavelength structures 32 are grouped into a plurality of arrangements having unique phase profiles that define a plurality of resolution units 34 (RUs 34). That is, the plurality of sub-wavelength structures 32 are arranged into RUs 34 that have unique phase profiles that delay the light transmitted through the RUs 34 by differing amounts of time. In some examples, the arrangements may be defined by dimensions of the sub-wavelength structures 32, for example a height, a length, and a width. In other examples the arrangements include a rotation angle of the sub-wavelength structures 32. These unique phase profiles are configured to adjust the phase of the light transmitted through the plurality of RUs 34 based on the operating temperature of the camera 10 and/or the operating temperature of image sensor 14, and also based on the RU's 34 respective radial distance from a center of the phased metalens 30.

FIG. 8 illustrates an example of two separate RUs 34 isolated from the plurality of RUs 34, having different phase profiles as denoted by "PHASE PROFILE 1" within the RU 34 positioned at "RADIUS 1," and by "PHASE PROFILE 2" within the RU 34 positioned at "RADIUS 2." In the example illustrated in FIG. 8, the plurality of RUs 34 located at a same radius (e.g., RADIUS 1) from a center of the phased metalens 30 have identical phase profiles, and the plurality RUs 34 located at a different radius (e.g., RADIUS 2) from the center of the phased metalens 30 have different phase profiles.

Referring again to FIG. 8, in some examples, a size of one RU 34 is equal to the size of four image pixels 36 of the image sensor 14. The maximum useful image resolution is limited to the Nyquist frequency, that is, the resolution in pixel size scaled to the camera 10 focus field 22 pixel size. In this example, this is equivalent to the size of four image pixels 36. In some examples, for the camera 10 with image pixels 36 measuring 2 μm×2 μm in size, the limiting resolution is an area of 4 μm×4 μm. Within this area, image information is sub-resolved or is not able to be reproduced or imaged. As such, the area of 4 μm×4 μm is the limiting dimension of the RU 34. Table 1 below illustrates an example of a scale of various characteristics of a 3 mm×3 mm phased metalens 30.

TABLE 1

EXAMPLE 3 mm × 3 mm PHASED METALENS

| FEATURE | SIZE |
| --- | --- |
| RESOLUTION UNIT: | 16 μm² (4 μm × 4 μm) |
| IMAGE PIXEL AREA: | 4 μm² (2 μm × 2 μm) |
| SUB-WAVELENGTH STRUCTURES: | |
| WIDTH | 0.040 μm-0.100 μm |
| LENGTH | 0.150 μm-0.400 μm |
| HEIGHT | 0.400 μm-0.600 μm |
| ROTATION | 0-2π RADIANS |
| AREA | 0.040 μm²-0.200 μm² |
| NUMBER OF SUB-WAVELENGTH STRUCTURES WITHIN AN IMAGE PIXEL: | 30-36 |
| NUMBER OF SUB-WAVELENGTH STRUCTURES WITHIN A RESOLUTION UNIT: | 120-144 |
| NUMBER OF RUs: | 562,500 |
| NUMBER OF SUB-WAVELENGTH STRUCTURES: | 67.5 MILLION-81.0 MILLION |

Referring to Table 1, in some examples, each RU 34 includes about 120 to 144 sub-wavelength structures 32. In this example, a focus characteristic encompassing a range of 11-12 discrete wavelengths with 11-12 discrete temperature offsets may be included within a single RU 34.

FIGS. 9A to 9C are plots of radial distances of the sub-wavelength structures 32 from the center of the phased metalens 30 versus a phase adjustment of the light. In these examples, three colors or wavelengths of visible light (blue, green, and red), at three operating temperatures (−40° C., 25° C., and 105° C.) are used to illustrate how the phased metalens 30 adjusts the phase of the exiting light rays. In these examples, as the respective radial distance of the plurality of RUs 34 increases from the center of the phased metalens 30 towards the periphery of the phased metalens 30, the unique phase profiles increase an amount of phase adjustment for a given wavelength of light. Referring to FIG. 9A (blue wavelength), the center of the phased metalens 30 is indicated at (0, 0), where the phase adjustment for the three temperatures is nearly zero. As the sub-wavelength structures 32 are moved away from the center of the phased metalens 30, the phase adjustment increases for the three temperatures indicated.

In the examples illustrated in FIGS. 9A to 9C, as the radial distance of the plurality of RUs 34 increases from the center of the phased metalens 30, the unique phase profiles increase an amount of phase adjustment for decreasing wavelengths of the light. Comparing FIG. 9A with FIG. 9B and with FIG. 9C, the phase adjustment for the blue light in FIG. 9A is greater than that for the green light of FIG. 9B, which is in turn greater than that for the red light in FIG. 9C. It will be understood that the wavelength of light increases from blue light to green light to red light.

In the examples illustrated in FIGS. 9A to 9C, as the radial distance of the plurality of RUs 34 increases from the center of the phased metalens 30, the unique phase profiles increase an amount of phase adjustment for a given operating temperature of the camera 10. Referring to FIGS. 9A to 9C, the plots of constant temperature show increasing phase adjustment as the radial distance of the sub-wavelength structures 32 increases from the center of the phased metalens 30.

In the examples illustrated in FIGS. 9A to 9C, as the radial distance of the plurality of RUs 34 increases from the center of the phased metalens 30, the unique phase profiles increase an amount of phase adjustment for increasing operating temperatures of the camera 10. Referring again to FIGS. 9A to 9C, as the temperature increases from −40° C. to 105° C., the amount of phase adjustment also increases.

Example Method

FIG. 10 illustrates example methods 100 performed by the camera 10. The operations (or steps) 102 through 108 are performed but not necessarily limited to the order or combinations in which the operations are shown herein. Further, any of one or more of the operations may be repeated, combined, or reorganized to provide other operations.

Step 102 includes PROVIDE PHASED METALENS. This can include providing a phased metalens 30 between the objective lens 12 of the camera 10 and the image sensor 14 as described above. The phased metalens 30 includes a plurality of sub-wavelength structures 32 or nanostructures that may be deposited on a substrate of optically transparent material as described above. The sub-wavelength structures 32 may be formed of metamaterials with structural features that can manipulate the light waves using various materials, as described above. The metamaterials may be selected based on the wavelengths of the electromagnetic radiation being sensed, as described above.

Step 104 includes ADJUST LIGHT PROPERTY. This can include shifting a phase of the incoming light rays via the plurality of sub-wavelength structures 32, as described above. The plurality of sub-wavelength structures 32 are grouped into a plurality of arrangements having unique phase profiles that define a plurality of resolution units 34 (RUs 34) as described above. The unique phase profiles delay the light transmitted through the RUs 34 by differing amounts of time based on the operating temperature of the camera 10 and/or the operating temperature of image sensor 14, as described above. The unique phase profiles delay the light transmitted through the RUs 34 by differing amounts of time also based on the respective radial distance of the RU's 34 from a center of the phased metalens 30.

Step 106 includes ADJUST FOCUS. This can include adjusting the focus field 22 over the temperature range of about 145° C. and over the associated changes in focal length of about 16 μm. This change in focal length is due primarily to the change in length of the camera housing caused by changes in the operating temperature as described above. This can also include adjusting the focus field 22 over the associated changes in a flatness range of the imaging substrate 28 of in a range of about 3 μm in the center of the imaging substrate 28 and in a range of about 7 μm at corners of the imaging substrate 28, as described above. This change in focal length is primarily due to warpage of the imaging substrate 28 as described above. The phased metalens 30 is configured to adjust the focus field 22 by a larger amount as the temperature reduces farther from the initial curing temperature, as described above. This can also include adjusting the focus field 22 over the temperature range of about 145° C. to compensate for both the expansion and/or contraction of the camera housing and the warpage of the imaging substrate 28 over the range of about 19 μm at the center of the imaging substrate 28, and over the range of about 21 μm at corners of the imaging substrate, as described above.

Step 108 includes DETECT OBJECT. This can include acquiring the image 16, with the controller circuit 15, and detecting the object 18 based on the signals received by the controller circuit 15 from the image sensor 14.

EXAMPLES

In the following section, examples are provided.

Example 1. A system, comprising: a phased metalens configured to adjust a focus of an image detected by an imaging substrate of an image sensor, the phased metalens being further configured to adjust a property of light that reaches the imaging substrate based on a change in a flatness of the imaging substrate.

Example 2. The system of the preceding example, wherein the property of the light that reaches the imaging substrate comprises a phase of all the light that reaches the imaging substrate at a same time.

Example 3. The system of any of the preceding examples, wherein the property of the light that reaches the imaging substrate comprises a phase of all the light that reaches a same reference point on the imaging substrate at a same time.

Example 4. The system of any of the preceding examples, wherein the reference point comprises a point having a greatest distance from the phased metalens along a line normal to a plane defining an image focus field of the phased metalens.

Example 5. The system of any of the preceding examples, wherein the phased metalens is configured to adjust the property of the light over a flatness range of 0 μm to about 7 μm.

Example 6. The system of any of the preceding examples, wherein the phased metalens adjusts the property of the light based on an operating temperature of the image sensor.

Example 7. The system of any of the preceding examples, wherein the phased metalens adjusts the property of the light over a temperature range of about 145° C.

Example 8. The system of any of the preceding examples, wherein the phased metalens adjusts the property of the light based on wavelengths of the light.

Example 9. The system of any of the preceding examples, wherein the wavelengths range from about 250 nm to about 1600 nm.

Example 10. The system of any of the preceding examples, wherein the phased metalens is located between the image sensor and a lens.

Example 11. The system of any of the preceding examples, wherein the phased metalens is located proximate the image sensor.

Example 12. A method, comprising: adjusting, with a phased metalens, a property of light that reaches an imaging substrate of an image sensor based on a change in a flatness of the imaging substrate, wherein all light exiting the phased metalens reach the imaging substrate at a same time, thereby adjusting a focus of an image detected by the imaging substrate.

Example 13. The method of the preceding example, wherein the property of the light that reaches the imaging substrate comprises a phase of all the light that reaches the imaging substrate at a same time.

Example 14. The method of any of the preceding examples, wherein the property of the light that reaches the imaging substrate comprises a phase of all the light that reaches a same reference point on the imaging substrate at a same time.

Example 15. The method of any of the preceding examples, wherein the reference point comprises a point having a greatest distance from the phased metalens along a line normal to a plane defining an image focus field of the phased metalens.

Example 16. The method of any of the preceding examples, wherein the phased metalens is configured to adjust the property of the light over a flatness range of 0 μm to about 7 μm.

Example 17. The method of any of the preceding examples, wherein the phased metalens adjusts the property of the light based on an operating temperature of the image sensor.

Example 18. The method of any of the preceding examples, wherein the phased metalens adjusts the property of the light over a temperature range of about 145° C.

Example 19. The method of any of the preceding examples, wherein the phased metalens adjusts the property of the light based on wavelengths of the rays of light.

Example 20. The method of any of the preceding examples, wherein the wavelengths range from about 250 nm to about 1600 nm.

Example 21. The method of any of the preceding examples, wherein the phased metalens is located between the image sensor and a lens.

Example 22. The method of any of the preceding examples, wherein the phased metalens is located proximate the image sensor.

Example 23. A camera, comprising: a phased metalens positioned between an objective lens and an image sensor of the camera, the phased metalens configured to adjust a focus of an image detected by the image sensor of the camera, the phased metalens further configured to adjust phases of rays of light of the image across an imaging substrate of the image sensor based on a change in a flatness of the imaging substrate, wherein all rays of light exiting the phased metalens reach the imaging substrate at a same time.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A system, comprising:
a phased metalens configured to adjust a focus of an image detected by an imaging substrate of an image sensor,
the phased metalens configured to adjust the focus of the image by adapting a focus characteristic of the image sensor to compensate for warpage of the imaging substrate.

2. The system of claim 1, wherein the warpage comprises a stress-induced warpage of the imaging substrate due to cooling of the image sensor from an initial curing process.

3. The system of claim 1, wherein the warpage comprises a stress-induced warpage of the imaging substrate that changes based on an operating temperature of the system.

4. The system of claim 1, wherein the warpage comprises a stress-induced warpage of the imaging substrate that increases as an operating temperature of the system decreases.

5. The system of claim 1, wherein the warpage comprises a stress-induced warpage of the imaging substrate that decreases as an operating temperature of the system increases.

6. The system of claim 1, wherein the phased metalens is configured to compensate for the warpage of the imaging substrate over a flatness range of 0 μm to about 7 μm.

7. The system of claim 1, wherein the phased metalens is configured to be located proximate the image sensor and between the image sensor and a lens.

8. The system of claim 1, wherein the phased metalens is configured to adjust a property of light that reaches the imaging substrate based on a change in a flatness of the imaging substrate caused by the warpage.

9. The system of claim 8, wherein the property of the light that reaches the imaging substrate comprises a phase of all the light that reaches the imaging substrate at a same time.

10. The system of claim 8, wherein the phased metalens is configured to adjust the property of the light based on an operating temperature of the image sensor.

11. The system of claim 8, wherein the phased metalens is configured to adjust the property of the light based on a color of the light.

12. The system of claim 8, wherein the property of the light that reaches the imaging substrate comprises a phase of all the light that reaches a same reference point on the imaging substrate at a same time.

13. The system of claim 12, wherein the reference point comprises a point having a greatest distance from the phased metalens along a line normal to a plane defining an image focus field of the phased metalens.

14. A camera, comprising:
an objective lens;
an image sensor comprising an imaging substrate configured to detect an image; and
a phased metalens positioned between the objective lens and the image sensor, and configured to adjust a focus of the image detected by the imaging substrate by adapting a focus characteristic of the image sensor to compensate for warpage of the imaging substrate.

15. The camera of claim 14, wherein the warpage comprises a stress-induced warpage of the imaging substrate due to cooling of the image sensor from an initial curing process.

16. The camera of claim 14, wherein the warpage comprises a stress-induced warpage of the imaging substrate that changes based on an operating temperature of the camera.

17. The camera of claim 14, wherein the warpage comprises a stress-induced warpage of the imaging substrate that increases as an operating temperature of the camera decreases.

18. The camera of claim 14, wherein the warpage comprises a stress-induced warpage of the imaging substrate that decreases as an operating temperature of the camera increases.

19. The camera of claim 14, wherein the phased metalens is configured to compensate for the warpage of the imaging substrate over a flatness range of 0 μm to about 7 μm.

20. The camera of claim 14, wherein the camera is configured for use in a vehicle.

* * * * *